Oct. 15, 1957    J. J. GREELY    2,809,704
TRACTION DEVICE
Filed Aug. 2, 1954    4 Sheets-Sheet 1
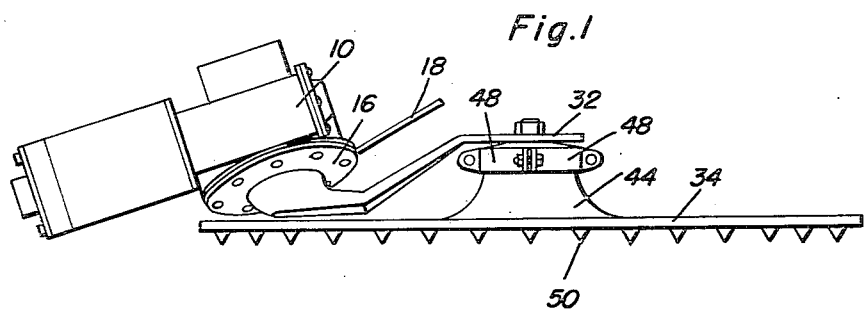
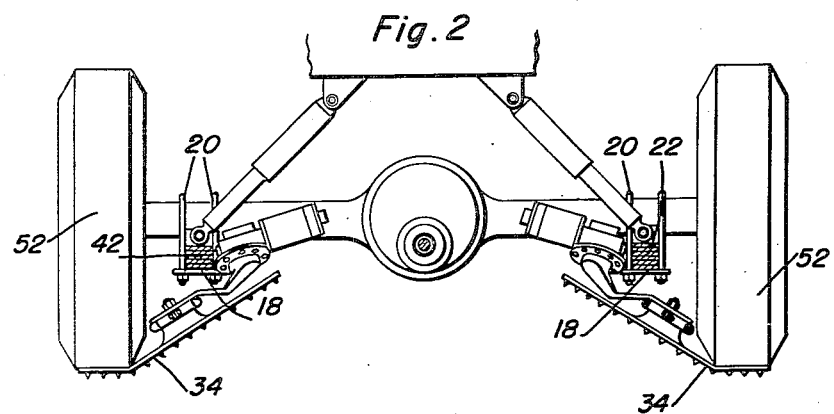
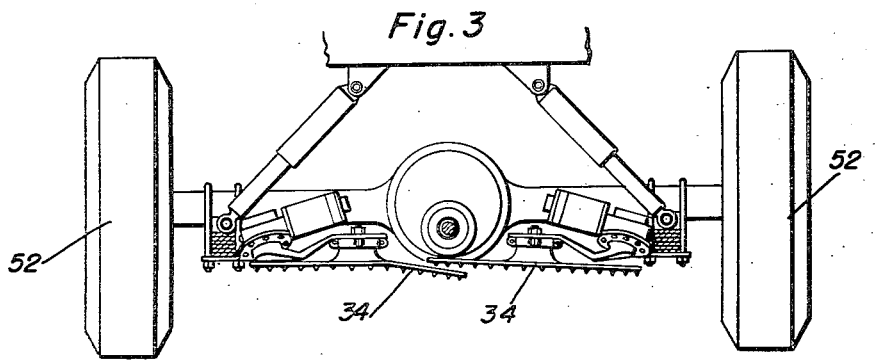
John J. Greely
INVENTOR.

Oct. 15, 1957  J. J. GREELY  2,809,704
TRACTION DEVICE
Filed Aug. 2, 1954  4 Sheets-Sheet 2

John J. Greely
INVENTOR.

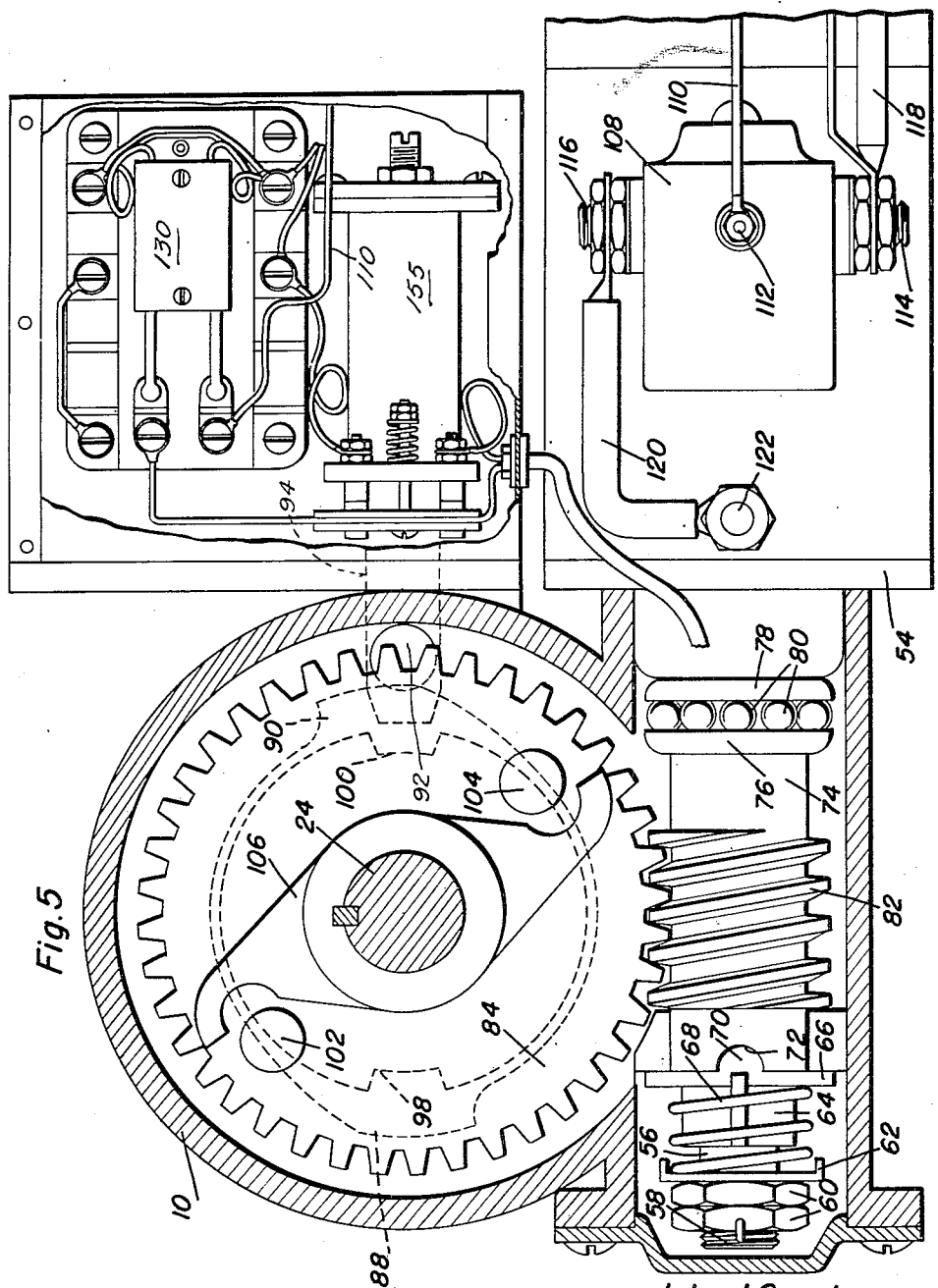

Oct. 15, 1957    J. J. GREELY    2,809,704
TRACTION DEVICE
Filed Aug. 2, 1954    4 Sheets-Sheet 4
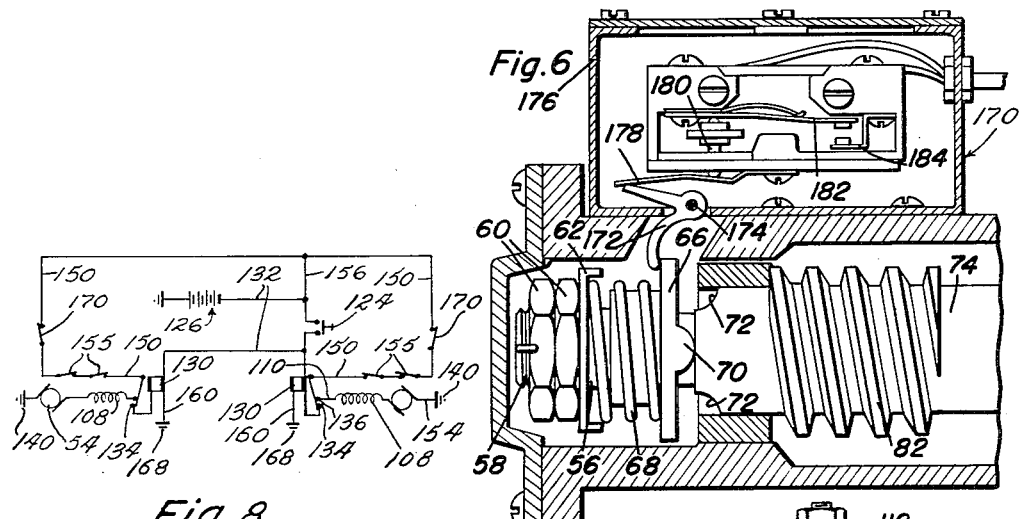
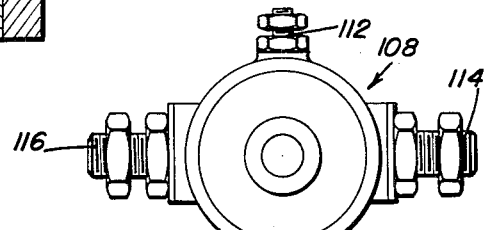
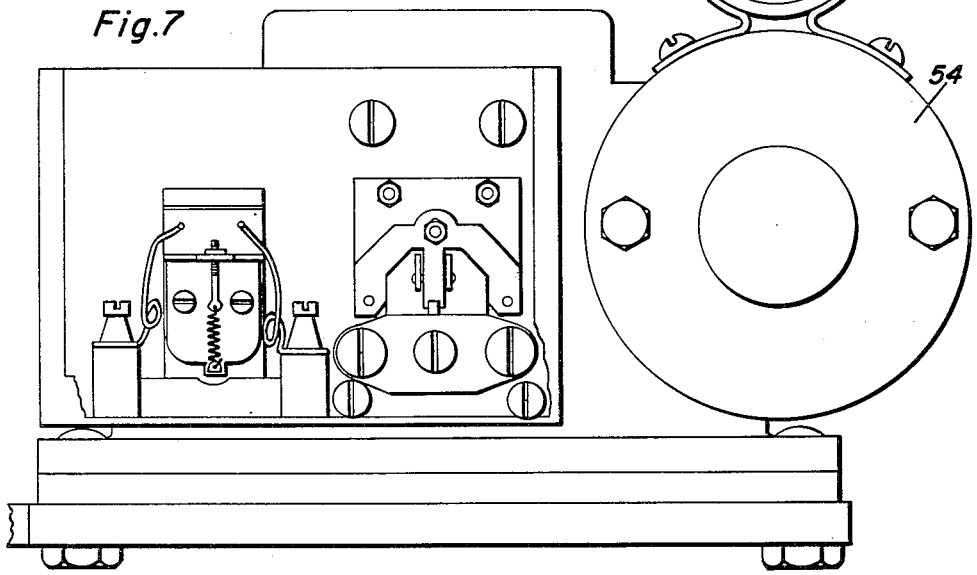
John J. Greely
INVENTOR.

United States Patent Office 2,809,704
Patented Oct. 15, 1957

2,809,704

TRACTION DEVICE

John J. Greely, Maysville, Ky.

Application August 2, 1954, Serial No. 447,298

2 Claims. (Cl. 180—15)

This invention relates in general to traction devices and has for its primary object the provision of improvements in vehicle traction devices of the type utilizing a freely rotatable abrasive disk which is selectively projectable into operative position beneath a vehicle wheel.

Another object of this invention is to provide an improved traction device which incorporates a compact and effective drive mechanism embodying an operating shaft, drive means for rotating the shaft and latch mechanism for selectively holding the traction disk in operative or inoperative position.

Another object of this invention is to provide an improved traction device in conformity with the foregoing objects wherein the drive means includes an electric motor, a gear freely rotatable on the shaft and operatively connected with the electric motor and a lost motion connection between the gear and the operating shaft.

Still another object of this invention is to provide improvements in a traction device generally in accordance with the foregoing objects in which novel switch mechanisms are incorporated in the traction device drive to assure proper positioning of the traction disk either in its operative or inoperative position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of one of the traction devices constructed in accordance with this invention;

Fig. 2 is a diagrammatic elevational view showing a pair of the traction devices mounted on a vehicle and in operative position;

Fig. 3 is a view similar to Figure 2 but showing the inoperative position of the traction disk;

Figure 5 is an enlarged sectional view taken through the traction device;

Figure 6 is an enlarged sectional view taken through the electric motor drive assembly and showing an overload safety switch associated therewith;

Figure 7 is an elevational view of the traction device; and

Figure 8 is a circuit diagram for the traction device.

Figure 4:
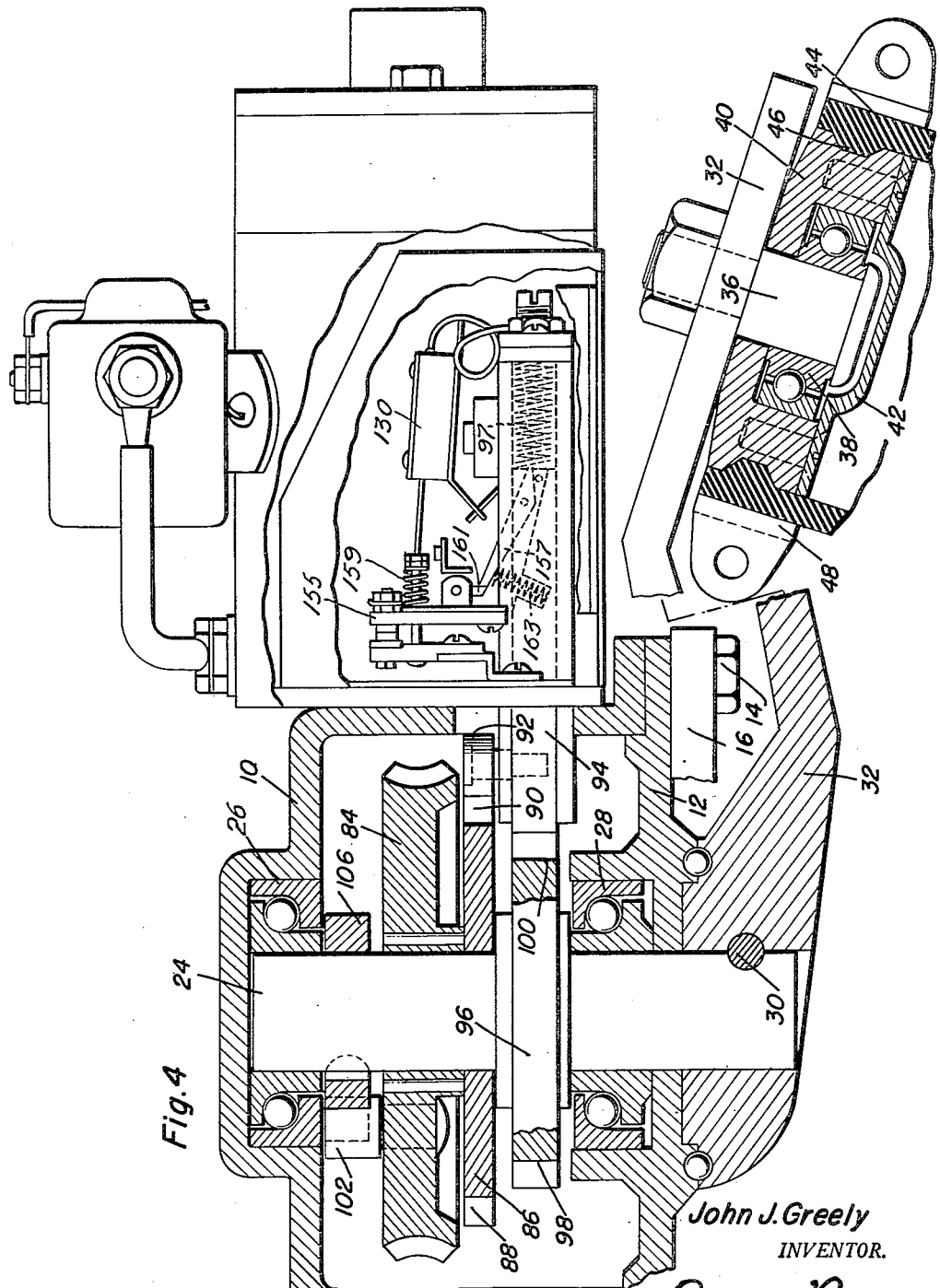
Figure 4 is an enlarged sectional view taken through the traction device.

Referring now more particularly to the drawings, the traction device will be seen to consist essentially of a casing member 10 having a bottom cover member 12 removably secured thereto as by fasteners 14 or the like. Also mounted on the casing 10 by the fasteners 14 is a mounting plate assembly 16 which includes a laterally projecting portion 18 suitably apertured for the reception of the spring U-bolt members 20 by means of which the traction device is rigidly secured in close proximity to the vehicle springs 22, see particularly Figures 2 and 3.

An operating shaft 24 is suitably journalled in the casing 10 by a bearing member 26 and in the cover member 12 by a bearing member 28 and it will be seen that a lower end portion of the operating shaft 24 projects from the casing and cover assembly and has rigidly affixed thereto as by a pin member 30, the arm member 32 which has rotatably affixed to its free end the traction disk member 34.

The manner of connecting the traction disk to each associated arm 32 is shown most clearly in Figure 4 wherein it will be seen that the free end of the arm 32 carries a bolt or pin member 36 upon which a ball bearing member 38 is mounted. A circumferentially grooved hub 40 is received on the bearing member 38 and a cover member 42 removably secured to the hub 40 seals the ball bearing 38 from dust and other foreign material. The traction disk 34 has a laterally offset central portion 44 provided with an inner circumferential tongue 46 received in the peripheral or circumferential groove of the hub 40 for locking engagement therewith. A sectionalized clamping assembly 48 embraces the traction disk central portion 44 and clamps this portion of the traction disk into operative engagement with the hub 40 in a manner which will be readily apparent. The traction disk itself is formed of flexible material and is provided on its undersurface with steel spikes members 50 for gripping snow and ice in winter driving. For summer driving conditions, the undersurface of the traction disk 34 may be provided with abrasive particles such as emery in lieu of the spikes 50.

As will be seen most clearly in Figures 2 and 3, the arms 32 of the traction devices shown therein are swingable between operative and inoperative positions to selectively position the traction disk 34 into and out of engagement with the driving wheel 52 of the associated vehicle.

As seen most clearly in Figure 5, the casing 10 has a motor assembly 54 rigidly secured thereto and a drive shaft member 56 of the motor extends into the casing and is provided at its threaded free end 58 with a double lock nut assembly bearing against the washer member 62. Slidably keyed to the drive shaft 56 is a collar member 64 having a radial shoulder 66 and a coil spring 68 is interposed between this shoulder 66 and the washer 62 to normally engage or urge the collar 64 toward the position shown in Figure 5. The opposite face of the shoulder 66 is provided with detents 70 engageable within notches 72 in a worm shaft sleeve 74 which is rotatably received on the drive shaft 56. The end of the worm shaft sleeve 74 which is adjacent the motor 54 is provided with a shoulder 76 and a similar shoulder 78 forming a fixed part of the motor cooperates therewith for interposition therebetween of the ball members 80 to provide a thrust bearing. It will be readily appreciated that the collar or sleeve 64 forms an overload release drive between the drive shaft 56 and the worm shaft sleeve 74 which prevents overloading and breakage of the assembly.

The worm gear 82 on the sleeve 74 meshes with a worm wheel member 84 which is freely rotatable on the operating shaft 24 previously described. Rigidly carried by the gear 84 is a cam member 86 having diametrically opposed lower portions 88 and 90 adapted to cooperate with a roller member 92 carried by a sliding latch bar member 94. Rigidly affixed to the shaft 24 is a latching plate member 96 having a pair of diametrically opposed notches 98 and 100 therein selectively receiving the inner end of the latch bar 94 in the operative and inoperative positions of the arm member 32 to maintain this arm in an associated position.

The gear 84 carries a pair of roller members 102 and 104 and the shaft 24 has rigidly affixed thereto a lost motion connector 106 cooperating with the rollers 102 and 104 such that drive is imparted to the shaft 24. In this respect, it is to be noted that the relationship of parts is such that the rollers 102 and 104 are normally spaced from the lost motion connector 106 and that upon initial movement of the worm 82, the gear 84 will rotate and carry with it the cam 86 to disengage the latch bar 94 from one of its associated grooves 98 or 100, the shaft 24 being stationary at this time. Thereafter, the pins 102 and 104 will engage the connector 106 and cause rotation of the shaft 24 and consequent rotation of the arm 32 either to its operative or inoperative position, dependent upon the previous positioning of the disk.

To effect the rotation of the worm 82, the electric motor 54 is provided with a solenoid control valve member 108 having a connector or lead 110 connected to one terminal 112 thereof such as to cause operation of the switch and connection between the two terminals 114 and 116. The lead 110 preferably is connected to a dash controlled switch button through the medium of relays 130 and it will be readily apparent that the terminal 114 is connected by a lead 118 to the battery of the vehicle while the other terminal 116 is connected by a short wire 120 to a terminal 122 for energizing the motor.

As seen most clearly in Figure 8, the push button switch for controlling the starter solenoids 108 is indicated by the reference character 124, whereas the current source, a battery, is indicated by reference character 126. Relays are designated by numerals 130. The operation is such that when the push button 124 is depressed, each lead 132 is energized, causing the terminals 134 and 136 to be switch connected within the relay 130, energizing lead 110, the motor 54 and through lead 154 to ground at 140. Simultaneously, the limit switch 155, being normally closed, has formed a "stick" circuit for the relay 130 through leads 150, 156 and 160 to ground at 168. An overload switch is indicated by reference character 170, in series with the limit switches.

As seen most clearly in Figure 6, the overload switch 170 takes the form in which a bell crank 172 is pivoted as by pin 174 to the switch housing 176 and one end of the crank is disposed in the path of movement of the shoulder 66 while the other end engages a spring finger 178, in turn engaging plunger 180 so that when the assembly is in the position shown, the resilient contact 182 will be urged out of its normal engagement with the fixed contact 184. Thus, operation of either the limit switches or the overload switch will deenergize the "stick" circuit and stop motion of the electric motors.

In the operation of the device when push button 124 is pressed, current from the battery is applied to the two-fold relay 130 energizing the coil thereof and closing the switch. As the switch is closed it completes two circuits, one passing through the single pole switch 155 and the overload switch 170, this circuit acting as a holding power to keep the relay coil energized after release of the push button 124.

The current through the second pole of the relay is conducted through a starter switch or solenoid 108 to the motor 54, which when actuated turns the worm gear 82 connected to the end of the motor shaft, this worm gear in turn being meshed with worm wheel 84 which turns freely on shaft 24.

The cam 86 attached to the bottom side of worm wheel 84 presses against the roller 92 which is attached to the latching bar 94, the disk 96 normally pressing the roller 92 and latching bar 94 radially away from the shaft 24. The disk 96 is however provided with notches 98 and 100 as noted previously which are in diametrically opposite sides of the disk and are so shaped that the latching bar fits into these notches locking the disk so that it cannot turn. As the latching bar 94 is pressed out of its associated notch 98 or 100, the disk 96 leaves the shaft 24 free to turn.

The driving pins 102, 104 which are fastened to the worm gear 84 engage the notches in the ends of the driving bar 106, which bar is keyed to the shaft 24 for rotation therewith upon engagement thereof by the drive pins 102 and 104.

Cam 86 is timed so that at this point it releases the roller 92 and latching bar 94 which is pushed and held against the smooth surface of the notched disk 96 by means of the coil spring 97 at the outer end of the latching bar 94. When the combination of parts is rotated one-half a revolution, one of the notches in the disk 96 again comes into line with the latching bar 94 which is forced into the notch by the pressure spring 97.

As the latching bar 94 starts to drop into the notch, the breaker switch 155 is momentarily opened by means of the trip lever switch 157, which by the forward movement of the latching bar is pressed against the switch trigger 161. As it continues to move the switch 157 overcomes the holding spring 159 whereby the switch is opened and the holding circuit broken, releasing relays 130 and opening the motor circuit thereby stopping motor 154.

At this point, the disk arm 16 that is keyed to the bottom end of the shaft 24 is stopped at a point near the rear wheel of the vehicle as shown in Figure 2.

As the wheel moves forward, the flexible rubber disk 34 being mounted on the outer end of the arm 16 with a ball bearing and axle 36 of the arm being locked in position, the disk underlies the vehicle wheel and is permitted rotation in either direction with the movement of the wheel.

As noted previously, the underside of the winter disk is provided with sharpened steel spikes.

Further, the disk 34 is designed with a cupped center portion which allows road clearance of the metal parts of the arm and also lets the disk give to the uneven surface of the road without straining the disk mounting.

To release the traction device, the operator presses the button switch 124 and the action of the device is repeated and the disk returned to the off-position shown in Figure 3.

Note the latching bar 94 is released and pressed outwardly, the trip lever 157 compresses the lever spring 163 allowing the lever to pass under the trip 161 and be again in position to cut off the motor at the proper time.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a traction device, a casing, a shaft journalled within said casing and having an end portion projecting therefrom, an arm connected to said projecting end portion of the shaft, a traction disk rotatably carried by the free end of said arm, a motor connected to said casing, and means for operating said motor and moving said arm between operative and inoperative positions with respect to a vehicle wheel, said means including a latch plate fixed to said shaft, a latch bar engageable with said plate to maintain said arm, selectively, in its operative and inoperative positions, a gear freely rotatable on said shaft and drivingly connected with said motor, a cam rigid with said gear for disengaging said latch bar, a lost motion connection between said gear and said shaft for rotating the latter subsequent to disengagement of said latch bar, an electrical circuit for energizing said motor, and a switch connected with said latch bar, and responsive upon movement of said bar to the latching position for deenergizing said motor.

2. In a traction device, a casing, a shaft journalled within said casing and having an end portion projecting therefrom, an arm connected to said projecting end portion of the shaft, a traction disk rotatably carried by the free end of said arm, a motor connected to said casing, and means for operating said motor and moving said arm between operative and inoperative positions with respect to a vehicle wheel, said means including a latch plate fixed to said shaft, a latch bar engageable with said plate to maintain said arm, selectively, in its operative and inoperative positions, an electrical circuit for energizing said motor, and a switch connected with said latch bar for deenergizing said motor when said bar is moved to the latching position.

References Cited in the file of this patent

UNITED STATES PATENTS

| | | |
|---|---|---|
| 1,403,270 | Small | Jan. 10, 1922 |
| 2,140,606 | Strickles | Dec. 20, 1938 |
| 2,283,948 | Ridgway | May 26, 1942 |
| 2,519,598 | Patten | Aug. 22, 1950 |

FOREIGN PATENTS

| | | |
|---|---|---|
| 784,469 | France | July 22, 1935 |